UNITED STATES PATENT OFFICE.

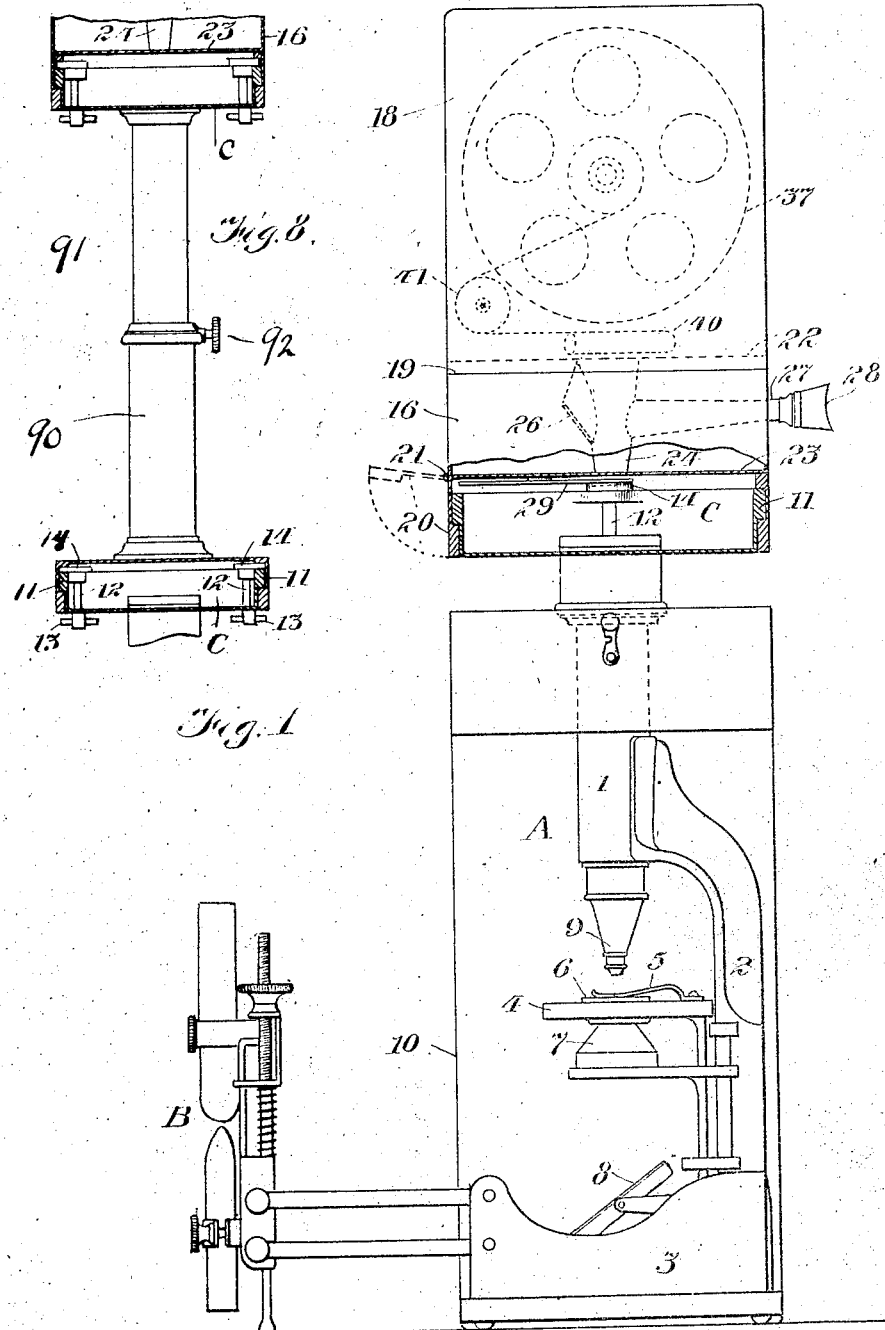

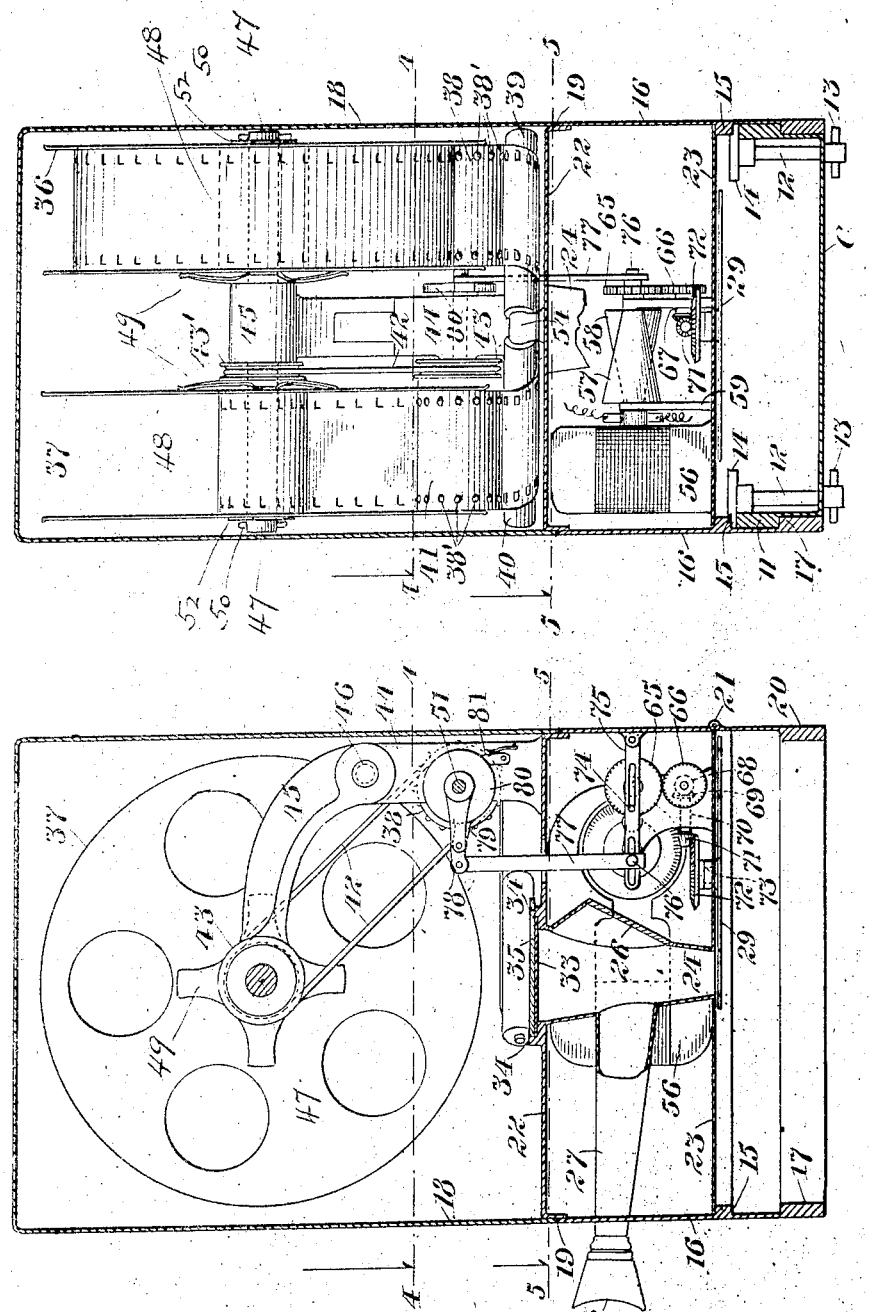

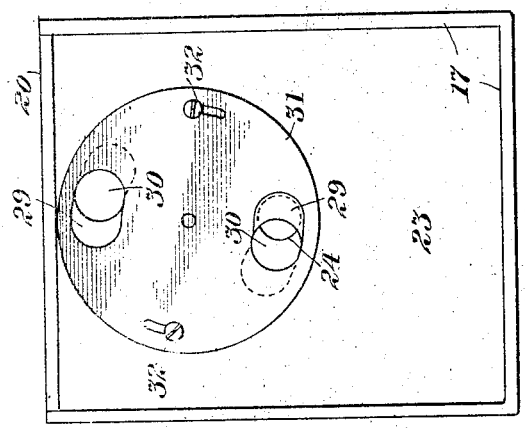
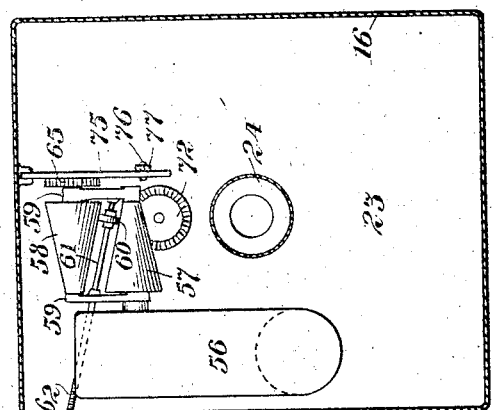
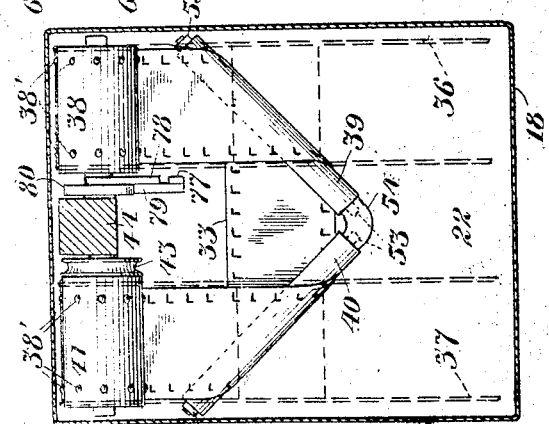

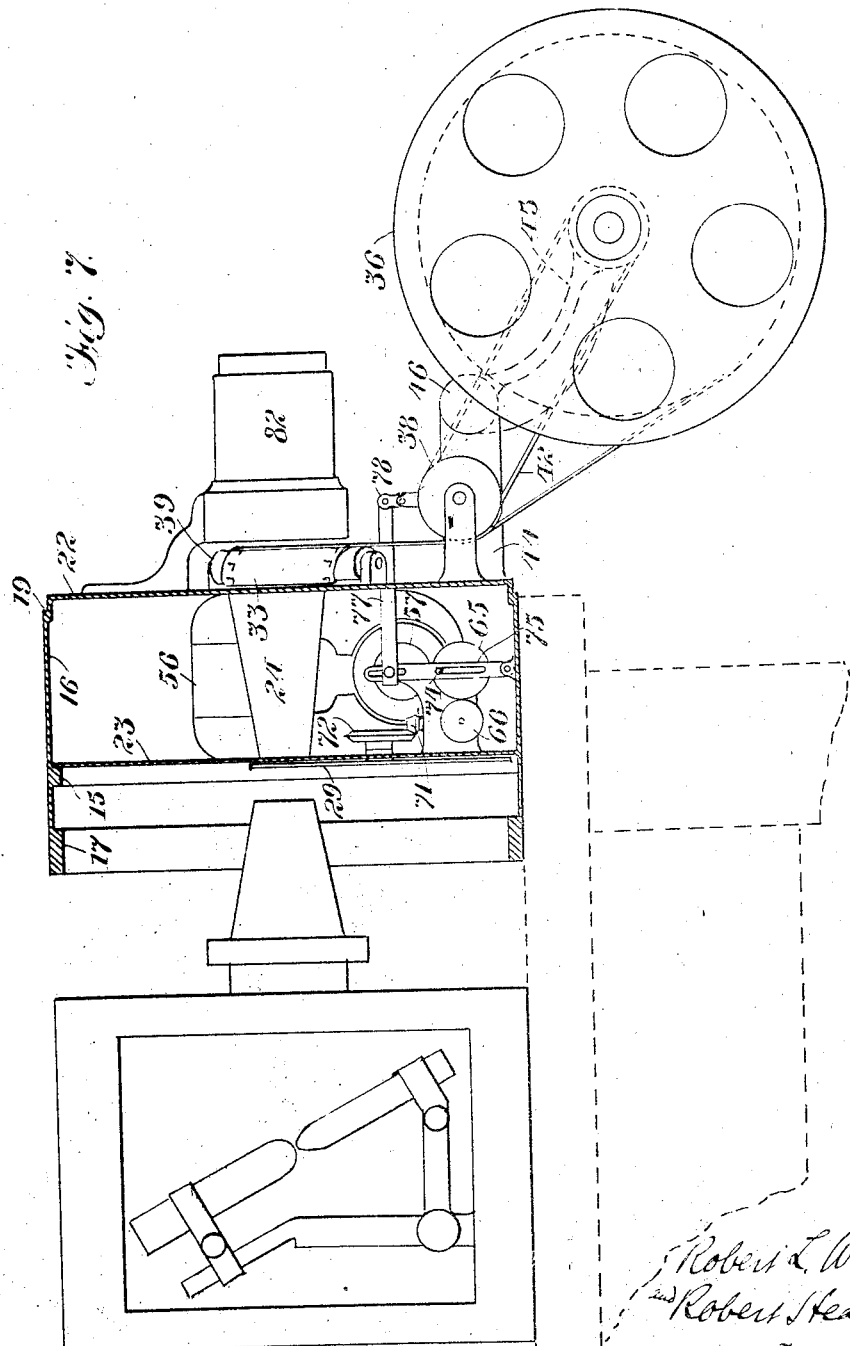

ROBERT L. WATKINS AND ROBERT HEAD, OF NEW YORK, N. Y.; SAID HEAD ASSIGNOR TO SAID WATKINS.

COMBINED MOVING-PICTURE TAKING AND PROJECTING APPARATUS.

No. 926,970.　　　Specification of Letters Patent.　　　Patented July 6, 1909.

Application filed July 10, 1908.　Serial No. 442,835.

*To all whom it may concern:*

Be it known that we, ROBERT L. WATKINS and ROBERT HEAD, both citizens of the United States, and residents of the city, county, and State of New York, have jointly invented certain new and useful Improvements in Combined Moving-Picture Taking and Projecting Apparatus, of which the following is a specification.

Our present invention relates to an apparatus, especially adapted in the form shown for use in connection with a microscope, to take a series of pictures of a given object and thereafter to project same after the manner of a kinetoscope upon a screen.

In the drawings which show only one of the forms which our invention may take, Figure 1 is a side elevation of an apparatus within our invention showing part thereof broken away to reveal internal structure and showing certain other internal parts in dotted lines, the apparatus being shown in connection with a microscope for use in taking a series of pictures; Fig. 2 is a view partly in vertical section and partly in elevation of the apparatus shown in Fig. 1 detached from the microscope and looking at the reverse side to that shown in Fig. 1; Fig. 3 is a sectional view through the casing and an elevational view of the contained parts as seen from the left-hand in Fig. 2, the tube 24 and connected parts being broken away to show the parts behind; Fig. 4 is a view partly in horizontal section and partly in plan on the line 4—4 in Fig. 3 looking in the direction of the arrow; Fig. 5 is a view partly in horizontal section and partly in plan on the line 5—5 in Fig. 3, looking in the direction of the arrow; Fig. 6 is a view looking up at the bottom of the devices in Fig. 3; Fig. 7 is a side elevation of our apparatus used in connection with a projecting lantern for projecting the pictures upon a screen; and Fig. 8 is a side elevation on a smaller scale to show an attachment useful on occasion to increase the distance between the photographic film and the object to vary the extent of the field and for other purposes.

Describing now our invention with particular reference to the devices of the drawings, Fig. 1 shows an apparatus within our invention, details of which are set forth more particularly in the remaining figures, said apparatus being in connection with a microscope. The microscope and attachments are of a kind more particularly set forth in our co-pending application, Ser. No. 440,438 filed June 26, 1908, for improvements in photomicrographic apparatus. Accordingly the microscope and attachments will be but briefly described herein as comprising a microscope A, an arc lamp B, and a pan or bottom C, mounted on the microscope tube. The microscope may be of any desired construction, that shown having a tube 1, a pillar 2, a base 3, a stage 4, clips 5 adapted to secure the slide 6 or other object in position on the stage, a condenser 7, and a mirror 8. In the microscope shown the focusing is effected by adjusting the stage to and from the objective 9. The arc-lamp B when in its operative position in Fig. 1 is adapted to radiate light to the mirror which reflects it up through the condenser, object and microscope tube.

When not in operation the lamp is adapted to be folded into vertical position alongside the microscope tube as explained in our application above referred to, thereby making a compact arrangement of devices adapted to be inclosed in box 10. This is the same box B shown in the other application which in the present application, Fig. 1, is in its lowermost position on the microscope tube and hinged open with the top portion of the box hanging down. The pan C corresponds with the member 41 of the other application and comprises what may be described as a shallow pan rectangular in outline and having an overhanging flange 11 around it. The pan is shown in the present Fig. 1 in its uppermost position of vertical adjustment, the same as in Figs. 2 and 6 of the other application referred to. It is also provided with the same locking devices, comprising vertical stems 12 operated by external handles 13, said stems having cam-heads 14 adapted to take under projections 15 on the inside of box 16 and to elevate said box from the pan until the inwardly projecting flange 17 on the box is brought into binding contact with the overhanging flange 11 on the pan.

The box 16 forms a lower compartment to an upper box 18, the two being separable at joint 19 (see Fig. 2) to permit the lifting off of the upper box. Again the lower box can be removed from the pan by lifting one of the sides 20, which has a spring hinge-connection 21 with the box to give the movable side an inward tendency, whereupon the box can be slid off the pan in the direction of the arrow in Fig. 1. The lower box has a top 22 separating it from the upper box and further has a horizontal partition or floor 23 below said top. Between these is a tube 24 open at its ends. Preferably this tube enlarges in upward direction as shown, its lower or smaller end being directed toward the microscope eye-piece and its upper or larger end receiving across it the travel of the film in both taking and projecting the pictures.

A mirror 26 is located in the tube to reflect the image from a screen, which may be the film itself, into and through the sight-tube 27. The latter may be provided with an additional tube 28 adapted at its outer end to form a close fit with one or both eyes of the operator or it may have connected therewith in light-tight manner a piece of black cloth to go over the head of the operator to prevent the entrance of light to fog the sensitive film while the operator is looking at the image reflected in the mirror. Thus the operator if he so desires, can freely view the film throughout the taking of the pictures.

At the eye-piece end of the tube is a rotating shutter consisting of a disk 29 best shown in plan in Fig. 6, centrally pivoted and having opposite openings 30 located to pass under the eye-piece opening to the tube 24. A second disk 31 in all respects similar to the first may be attached to the first disk and may have a set-screw and slot connection 32 therewith, whereby one disk may be moved relative to the other to give larger or smaller area to the openings. Thus in taking pictures, the openings may be of the full size shown, whereas in projecting pictures the disks will ordinarily be adjusted for smaller openings. The film 33 travels across the upper end of the tube 24 and may be confined at its edges between guides 34 (Fig. 2) and may have a backing piece 35 above the film to act as a support as the film travels.

The film is contained in the upper box 18 and is wound by mechanism hereinafter described, from a delivery reel 36 over upon an adjacent take-up reel 37. The film from the delivery reel comes forward, in Fig. 3, about an idle drum 38, having projecting pins 38' received in the edge-openings 40 in the film. From the drum 38 the film is delivered under a roller 39 inclined at an angle 45° to the line of travel, as best shown in plan view in Fig. 4, thence across the upper end of the tube 24 and under a second inclined roller 40 and up over said roller and back under a second or driving drum 41, having also projections 38' to engage the edge-openings in the film.

When the drum 41 is driven, it draws the film in the direction of the arrows in Fig. 4 from the delivery reel 36 over the idle drum 38 and idle rollers 39 and 40, whence said film being carried under the driving drum 41 as shown in Fig. 4, comes up over said drum and back over the take-up reel 37.

The mounting of the reels comprises a standard 44 extending uprightly from the top 22 of the lower box and has an overhanging arm 45 pivoted at 46 thereto. The pivot joint is such, that the pivot arm is rigidly supported from the standard, when said arm is in either its forward position shown in Fig. 2 or in its reverse position shown in Fig. 7. From the free end of said arm 45 project on either side studs 47 over which the hubs 48 of the reels 36 and 37 loosely fit. Loose on each stud next the arm 45 is a spider 49 having yielding arms adapted to bear against the sides of the reels, which in each case are shown retained in the studs by cotter pins 50 with intermediate washers 52.

The spider 49 that bears on reel 37 carries (Fig. 3) a pulley 43' connected by belt 42 with pulley 43 on the driving drum 41, whereby as fast as or whenever the driving drum takes up a portion of the film for delivery to the take-on reel, said portion of the film which would otherwise remain slack is wound on the reel by the belt-connection in obvious manner. As soon as the slack is taken up, the spider will slip on the reel 37 without turning it or disrupting the film. The drums 38 and 41 are supported on a shaft 51 which works in end bearings and for a central bearing passes through an opening in the standard 44 as best shown in Figs. 3 and 4. The end bearings are supported on feet not shown or in other suitable manner from the top 22 of the lower box. The driving drum 41 and pulley 43 are rigid on said shaft 51, whereas the idle drum 38 turns loosely on the shaft. The rollers 39 and 40 are rotatably supported with end pins or trunnions 53 (Fig. 4) located in bearings 54 and 55.

Means is provided, driven by the electric motor 56, for automatically and intermittently operating the film to hold it stationary during the interval of exposure (or projection) and then to progress enough length of unexposed film for the next picture and in turn to hold this for exposure and so on. Similarly the rotating shutter is driven from the same means to have synchronous motion so that a shutter opening passes under the eye-piece end of the tube 24 at the moment when the film is stationary, whereas the solid portion of the disk covers the opening while the exposed film is being progressed and fresh film is being brought forward into position. These means shown include friction cones, one of which 57, is supported axially on the armature shaft to rotate therewith and the other 58 of which is rotatably supported between standards 59 in the parallel relation, shown in Fig. 5, to the armature cone.

A friction disk 60 mounted rotatably on a stem 61 between collars is located between the cones to form a frictional transmission to drive cone 58 from the armature cone 57. The stem has suitable bearings and at its outer end may have screw-threads 62 and a knurled head 63, the screw-threads being received through a corresponding nut 64 stationary on the wall of the box, whereby turning the knurled head moves the stem in and out, and correspondingly moves the friction disk into various positions along the cone. Thus when the disk is in the position shown in Fig. 5 it drives cone 58 at lower speed, whereas when it is in position to the left, it increases the speed of the driven cone as will be understood.

The shaft of the driven cone has a gear wheel 65 which meshes below with a gear wheel 66 on a rotating stud 67 (Fig. 3) having at its other end a miter gear 68 in mesh with another miter gear 69 (Fig. 2) which is on a rotating stud 70 working at right angles to the first named stud and having at its other end a bevel pinion 71 in mesh with a bevel gear 72, the latter being on the vertical rotating stud 73 which operatively supports the rotating shutter-disk 29.

Thus from the connections so far described, it will be apparent that operating the motor drives the rotating shutter through the intervening frictional and toothed gearing as set forth.

Projecting from the side of the gear wheel 65 is a pin 74 (Fig. 2) working in the slot of a lever 75 pivoted at one end to the wall of the lower box and at its other end having a slot and pin connection 76 with a pitman 77 which extends upwardly through an opening in the top of the lower box and connects pivotally with an arm 78 loose on the drum-shaft 51. This arm 78 has a friction pawl 79 pivotally supported therefrom, the end of said pawl being adapted on the down-stroke of the pitman to bear against the periphery of a friction disk 80 tight on the drum shaft. The result of the described mechanism is that the operation of the motor oscillates the lever 75 and gives reciprocating motion to the pitman 77 which on its down-stroke carries the friction disk and consequently the driving drum 41 with it, whereas on its up-stroke the friction disk and driving drum remain stationary due first, to the disengagement of the pawl 79; and second, to the engagement with the friction-disk of a secondary pawl 81 (Fig. 2) adapted to permit the forward drive of the friction-disk but to resist and prevent its return.

The slot and pin connection 76 between the oscillating lever 75 and the pitman 77 permits the relative adjustment of these parts to regulate the extent of vertical throw of the pitman and consequently the extent of the angle through which the driving drum 41 is carried at each downward stroke. The result is that the feed of the film to the opening in the tube 24 can be regulated to correspond to the height of the pictures desired to be photographed or projected.

Due to the fact that the film feeding means and the shutter operating means are interconnected, it is apparent that the operation of both can be relatively timed to intermittently operate the film in proper relation to the shutter as heretofore indicated.

To use our apparatus for taking a more or less rapid succession of pictures of a microscopic object, the apparatus will be connected with the microscope somewhat after the manner shown in Fig. 1. If there is no sensitive film in the apparatus, same will be inserted by removing the upper box 18 from the apparatus and inserting a reel 36 filled with a sensitive film, this operation being of course conducted in a dark room, the end of said film being carried around the various drums and rollers and attached to the hub of the take-on reel 37 as heretofore indicated. The upper box is then latched back into place and the apparatus is ready for making exposures. The object having been properly adjusted on the microscope stage and the lighting devices arranged, the operator will look through the sight-tube 27 and will focus the object sharply upon the film acting as a screen across the upper end of the tube 24, the focusing being accomplished by elevating and lowering the microscope stage. Once focused, the taking of pictures can be commenced and may be continued in full view of the operator at the sight-tube by turning on the current to the motor which thereupon rotates the shutter and in time therewith intermittently operates the film to make the successive exposures. Having made the exposures the film will of course be developed in the ordinary way and prepared if desired for projecting purposes. To use the apparatus for the latter purpose it will be disconnected from the microscope and will further have its upper box removed to let the reels swing down into the position shown in Fig. 7 with the box on its side as shown. Of course clamping means may be provided to properly secure the box to the table or other support. A projecting lantern will be mounted at the rear of the apparatus to project its light axially through the tube 24. Also a projecting lens device 82 may be secured to the front of the apparatus ahead of the film. The film containing the pictures to be projected contained on a delivery reel will now be placed in operative position and the film threaded about the drums and rollers and attached to the take-on reel in similar manner to that already described in connection with the apparatus when used for photographic purposes. The motor of the apparatus being now started, the pictures will be projected in succession upon the screen.

The device shown in Fig. 8 is an attachment useful on occasion to vary the distance between the photographic film and the object and comprises a pair of telescoping tubes 90 and 91 adapted to be secured together in any position of relative adjustment by taking up on the set screw 92, the tube 90 being supported on a box adapted to be connected with pan C on the microscope tube in analogous fashion to that shown and described in connection with Fig. 1, whereas tube 91 supports a pan C which in turn supports an upper and lower box, reels and film actuating mechanism together with tube 24, rotating shutter, and so forth, all of which is not shown in Fig. 8 because it may be a mere duplication of the boxes and contained mechanism supported on the pan C as in Fig. 1 and the other figures in detailed illustration of these parts.

Having thus described our invention, what we claim is:

1. A combined photographic and projecting apparatus comprising a box adapted to be connected in light-tight fashion to a microscope tube, the top of said box having an opening with internal tube surrounding it in line with the microscope tube; a second box located removably in light-tight fashion on top of the first box; film supporting devices in the second box adapted to support a film movably across the opening of the tube in the second box, said devices being adapted to be swung out of line with the axis of the tube after the second box is removed and when the apparatus is being used for projecting purposes; a shutter adapted to control the opening in the first box; means giving intermittent motion to the film; and shutter operating means opening the shutter when the film is stationary across the tube opening, and closing it when the film is in motion.

2. A combined photographic and projecting apparatus comprising a box adapted to be connected in light-tight fashion with a microscope tube, said box having an opening therethrough in line with the microscope tube; a second box located removably in light-tight fashion on the first box; film supporting devices in the second box comprising guides at the box opening guiding the film across said opening and further comprising delivery and wind-on reels adapted to be operated to wind the film from the delivery reel over upon the wind-on reel, said reels being supported on the first box to be swung out of interfering position with light projected axially through the box opening after the second box has been removed and when the apparatus is being used for projecting purposes; a shutter adapted to control the opening and closing of said box opening; means giving intermittent motion to the film; and shutter operating means opening the shutter when the film is stationary across the tube opening, and closing it when the film is in motion.

3. A combined photographic and projecting apparatus comprising a box adapted to be removably secured in light-tight fashion on a microscope tube, said box having a top and a transverse partition below the top with openings through said top and partition connected by a tube in line with the axis of the microscope; a second box on top of said first box removably connected therewith in light-tight fashion; film supporting devices in the second box comprising delivery and take-on reels and intervening guiding devices adapted to guide the film across the tube opening as the film travels from the delivery to the take-on reel; a rotating shutter in the first box adapted to be continuously operated to alternately open and close the tube opening; means giving intermittent motion to the film; and shutter operating means opening the shutter when the film is stationary across the tube opening, and closing it when the film is in motion.

4. In a combined photographic and projecting apparatus, the combination of film supporting devices comprising guides at the light opening of the apparatus guiding the film across said opening and further comprising delivery and wind-on reels adapted to be operated to deliver the film from the delivery reel to the wind-on reel opening, said reels being supported to be moved out of interfering position with light projected axially through the light opening when the apparatus is being used for projecting purposes; and a chamber adapted to inclose the film supporting devices and to be light-tight when the apparatus is being used for photographic purposes.

5. A moving picture apparatus comprising in combination a film delivery reel; a film wind-on reel; a driving member having projections received in apertures in a film and adapted to be rotated to draw the film across the light opening from the delivery reel; and means adapted intermittently to rotate said driving member comprising a friction disk rotating with the driving member, a swinging arm with friction pawl in contact with said disk, a pitman connecting said swinging arm to an oscillating lever, and operating means adapted to continuously oscillate said lever.

6. In a moving picture apparatus, the combination of a film delivery reel; a film wind-on reel; a driving member having projections received in the apertures of the film and adapted to be rotated to draw the film from the delivery reel across the light opening, a shutter adapted to be operated to open and close said opening; means adapted to give intermittent rotation to the film driving member comprising a friction disk rotating with the driving member; a swinging arm with friction pawl in contact with said disk, an oscillating lever, a pitman connecting said arm with said lever, continuously rotating means connected to oscillate said lever; an operative connection between said continuously rotating means and the shutter adapted continuously to operate said shutter and to time its opening to the idle stroke of the pitman, and its closing to the driving stroke of said pitman; and means adapted to prevent the friction disk from being rotated by the idle stroke of the pitman.

7. In a moving picture apparatus the combination of a film delivery reel; a film wind-on reel; a film driving member adapted to be rotated to draw the film from the delivery reel across the light opening; means adapted to give intermittent rotation to the driving member comprising a friction disk connected with the driving member, a swinging arm with friction pawl in contact with said disk, a pitman, an oscillating lever, an adjustable connection between said pitman and lever adapted to vary the stroke of the pitman irrespective of the invariable oscillation of the lever, and operating means adapted continuously to oscillate said lever.

8. In a moving picture apparatus, the combination of film supporting means adapted to provide for the progression of the film across the light opening in the apparatus; and means adapted to view the image on the film during the taking of the pictures including a sight tube leading into the apparatus and arranged to view said image, said tube having an eye-opening fitted to be looked into by the operator and adapted to bar the entrance of light to the film.

In witness whereof we have signed our names to the foregoing specification in the presence of two subscribing witnesses.

ROBERT L. WATKINS.
ROBERT HEAD.

Witnesses:
M. BERLER,
HANNAH CLAUSING.